(12) United States Patent
Yang

(10) Patent No.: US 10,742,138 B2
(45) Date of Patent: Aug. 11, 2020

(54) DEVICE FOR PROTECTING INVERTER USING A BUFFER OPERATING ACCORDING TO A STATE OF A SAFETY RELAY

(71) Applicant: LSIS CO., LTD., Anyang-si, Gyeonggi-do (KR)

(72) Inventor: Jin-Kyu Yang, Anyang-si (KR)

(73) Assignee: LSIS CO., LTD., Anyang-di, Gyeonggi-Do (KR)

( * ) Notice: Subject to any disclaimer, the term of this patent is extended or adjusted under 35 U.S.C. 154(b) by 0 days.

(21) Appl. No.: 16/299,956

(22) Filed: Mar. 12, 2019

(65) Prior Publication Data
US 2019/0372481 A1 Dec. 5, 2019

(30) Foreign Application Priority Data
May 30, 2018 (KR) .................. 10-2018-0061642

(51) Int. Cl.
*H02M 7/5395* (2006.01)
*H01H 45/14* (2006.01)
(Continued)

(52) U.S. Cl.
CPC .......... *H02M 7/5395* (2013.01); *H01H 45/14* (2013.01); *H02M 1/32* (2013.01); *H02M 7/4826* (2013.01)

(58) Field of Classification Search
CPC ........ H02M 1/36; H02M 1/084; H02M 1/088; H02M 1/092; H02M 1/32; H02M 7/5395; H02M 7/48
See application file for complete search history.

(56) References Cited

U.S. PATENT DOCUMENTS

| 6,611,441 B2* | 8/2003 | Kurokami | H02M 1/15 363/132 |
| 6,927,955 B2* | 8/2005 | Suzui | H02H 3/337 361/42 |

(Continued)

FOREIGN PATENT DOCUMENTS

| EP | 2426803 A2 | 3/2012 |
| JP | 2010104187 A | 5/2010 |

(Continued)

OTHER PUBLICATIONS

European Search Report for related European Application No. 19162675.3; action dated Sep. 23, 2019; (8 pages).

(Continued)

*Primary Examiner* — Thienvu V Tran
*Assistant Examiner* — Nusrat Quddus
(74) *Attorney, Agent, or Firm* — K&L Gates LLP

(57) ABSTRACT

A device for protecting an inverter include a first power switch configured to be turned on when a first voltage signal from a first switch of a safety relay is applied thereto; a second power switch connected in series with the first power switch, wherein the second power switch is configured to be turned on when a second voltage signal from a second switch of a safety relay is applied thereto; and a power line for connecting the first power switch and the second power switch to each other in series and for connecting the series of the first power switch and the second power switch to a buffer of the inverter, wherein a third voltage signal is applied via the power line to the buffer.

8 Claims, 2 Drawing Sheets

(51) Int. Cl.
 H02M 1/32 (2007.01)
 H02M 7/48 (2007.01)

(56) References Cited

U.S. PATENT DOCUMENTS

| | | | | |
|---|---|---|---|---|
| 8,749,277 B2* | 6/2014 | Kenney | ................... | H02M 1/08 |
| | | | | 327/109 |
| 9,209,718 B2* | 12/2015 | Sykes | ...................... | H02H 3/24 |
| 2014/0103894 A1* | 4/2014 | McJimsey | ................. | G05F 1/67 |
| | | | | 323/282 |

FOREIGN PATENT DOCUMENTS

| | | | |
|---|---|---|---|
| JP | 2012055125 | A | 3/2012 |
| JP | 2018057128 | A | 4/2018 |
| WO | 2008132975 | A1 | 7/2010 |

OTHER PUBLICATIONS

Korean Office Action for related Korean Application No. 10-2018-0061642; action dated Sep. 25, 2019; (4 pages).
Japanese Office Action for related Japanese Application No. 2019-034161; action dated Feb. 14, 2020; (5 pages).

\* cited by examiner

DEVICE FOR PROTECTING INVERTER USING A BUFFER OPERATING ACCORDING TO A STATE OF A SAFETY RELAY

CROSS-REFERENCE TO RELATED APPLICATION

Pursuant to 35 U.S.C. § 119(a), this application claims the benefit of earlier filing date and right of priority to Korean Application No. 10-2018-0061642, filed on May 30, 2018, in the Korean Intellectual Property Office, the disclosure of which is incorporated herein in its entirety by reference.

TECHNICAL FIELD

The present disclosure relates to an inverter-protecting device.

BACKGROUND

Recently, electric devices such as motors have become widespread, a possibility of an abnormal operation of the electric device leading to a serious accident is further increased. Thus, it is required to reduce a risk of an accident as much as possible. To put the risk occurrence within an allowable limit, international standards have been established. In one example, IEC61508 is defined as a standard for the electric device. IEC61800-5-2 is specified as a standard of a driver such as a motor.

When a safety signal is input, an inverter must not deliver power to the motor as defined in IEC 61800-5-2.

FIG. 1 shows a configuration of a conventional inverter-protecting device.

An inverter 100 receives AC power of three phases. Then, a rectifying module 101 in the inverter 100 rectifies the AC power. Then, a smoothing module 102 therein smoothes and stores a DC voltage rectified by the rectifying module 101. An inverting module 103 therein receives the DC voltage stored in a DC link capacitor as the smoothing module 102, and converts the DC voltage into an AC voltage having a predetermined voltage and frequency according to a PWM control signal, and, outputs the converted AC voltage to a motor 200. The inverting module 103 is configured to have three-phase legs. Each leg includes two switching elements connected in series. The switching element of the inverting module 103 is, for example, an insulated gate bipolar transistor (IGBT).

A safety relay 130 receives 24 V from the inverter 1. The safety relay 130 includes first and second switches 131 and 132 connected in parallel. The safety relay 130 has a closed state as a normal operation state.

When 24V is input to a SA terminal via the first switch 131, a first insulating module 140 insulates the corresponding voltage signal. A first receiving module 150 outputs a voltage detection signal. The first receiving module 150 is, for example, a photo coupler. The first receiving module 150 outputs a high-level voltage detection signal when an input voltage thereto is equal to or greater than a predetermined threshold, while the first receiving module 150 outputs a low-level voltage detection signal when the input voltage thereto is smaller than the predetermined threshold.

When 24V is input to a SB terminal via the second switch 132, a second insulating module 145 insulates the corresponding voltage signal. A second receiving module 155 outputs a voltage detection signal. The second receiving module 155 is a photo coupler. The second receiving module 155 outputs a high-level voltage detection signal when an input voltage thereto is equal to or greater than a predetermined threshold, while the second receiving module 155 outputs a low-level voltage detection signal when the input voltage thereto is smaller than the predetermined threshold. A transistor 160 prevents overcurrent and maintains a constant voltage.

When the first receiving module 150 outputs the high-level voltage detection signal, a controller 110 provides a pulse width modulation (PWM) control signal to a gate block 120. The gate block 120 outputs the PWM control signal to the inverting module 103 of the inverter 1. When the second receiving module 155 outputs the high-level voltage detection signal, the controller allows an enable pin of the gate block 120 to be active to enable the PWM control signal provided from the controller 110 to be outputted to the inverting module 103.

When the first receiving module 150 outputs the low-level voltage detection signal, this signal is input to a trip zone of the controller 110. The controller 110 prevents the PWM control signal from being provided to the gate block 120. Further, when the second receiving module 155 outputs the low-level voltage detection signal, the controller allows a disable pin of the gate block 120 to be active so that the PWM control signal is not output to the inverting module 103.

That is, when at least one of the first receiving module 150 and the second receiving module 155 outputs the low-level voltage detection signal, the PWM control signal may be prevented from being supplied to the inverting module 103. Thus, the electric power may be prevented from being supplied to the motor 200.

In such a conventional protection device, it is necessary for software to verify that the trip zone of the control unit 110 operates normally. Thus, there occurs a problem that such verification takes time and cost.

SUMMARY

In order to solve the problem, a purpose of the present disclosure is to provide an inverter-protecting device which can achieve a high safety level by implementing dual verification when protecting the inverter using hardware.

In one aspect of the present disclosure, there is provided a device for protecting an inverter, wherein the device is configured to determine, based on voltage signals received from a first switch and a second switch of a safety relay connected in parallel, whether to allow or disallow a pulse width modulation (PWM) control signal to be applied via a buffer of an inverter to an inverting module of the inverter, wherein the device comprises: a first power switch configured to be turned on when a first voltage signal from the first switch is applied thereto; a second power switch connected in series with the first power switch, wherein the second power switch is configured to be turned on when a second voltage signal from the second switch is applied thereto; and a power line for connecting the first power switch and the second power switch to each other in series and for connecting the series of the first power switch and the second power switch to the buffer, wherein a third voltage signal is applied via the power line to the buffer, wherein when the third voltage signal is applied via the power line to the buffer, the buffer is turned on to allow the PWM control signal to be applied to the inverting module.

In one implementation, the device further comprises: a first insulating module disposed between the first switch and the first power switch for isolating the first voltage signal;

and a second insulating module disposed between the second switch and the second power switch for isolating the second voltage signal.

In one implementation, the first voltage signal and the second voltage signal are applied from the inverter to the first switch and the second switch respectively.

In one implementation, the first voltage signal and the second voltage signal have the same magnitude.

In one implementation, the device further comprises a monitoring module configured for: receiving at least one of a voltage signal of a input node to the first power switch, a voltage signal of an input node to the second power switch, and a voltage signal of a node of the power line connecting the second power switch to the buffer; and outputting a monitoring signal corresponding to each of the voltage signals at the nodes.

In one implementation, the monitoring module includes an AND gate.

In one implementation, when both of the first switch and the second switch are turned on, both of the first power switch and the second power switch are turned on, and, thus, the third voltage signal is applied to the buffer via the power line, such that the buffer allows the PWM control signal to be applied to the inverting module.

In one implementation, when at least one of the first switch and the second switch is turned off, at least one of the first power switch and the second power switch is turned off, and, thus, the third voltage signal is not applied to the buffer, such that the buffer disallows the PWM control signal to be applied to the inverting module.

The present disclosure may implement a hardware-based inverter-protecting device without the verification using the software.

That is, the hardware-based inverter-protecting device in accordance with the present disclosure can control power to a buffer via first and second power switches connected in series such that when at least one of both signals from a safety relay is not input to the power switches, the power is prevented from being supplied to the buffer. This may enhance the safety function.

Further, the hardware-based inverter-protecting device in accordance with the present disclosure outputs a monitoring signal that monitors whether or not circuitry in the protection device is in a normal state and determines a presence or absence of a failure of the circuitry, thereby improving reliability of the circuitry itself.

Further specific effects of the present disclosure as well as the effects as described above will be described in conduction with illustrations of specific details for carrying out the invention.

DETAILED DESCRIPTION

Figure 1:
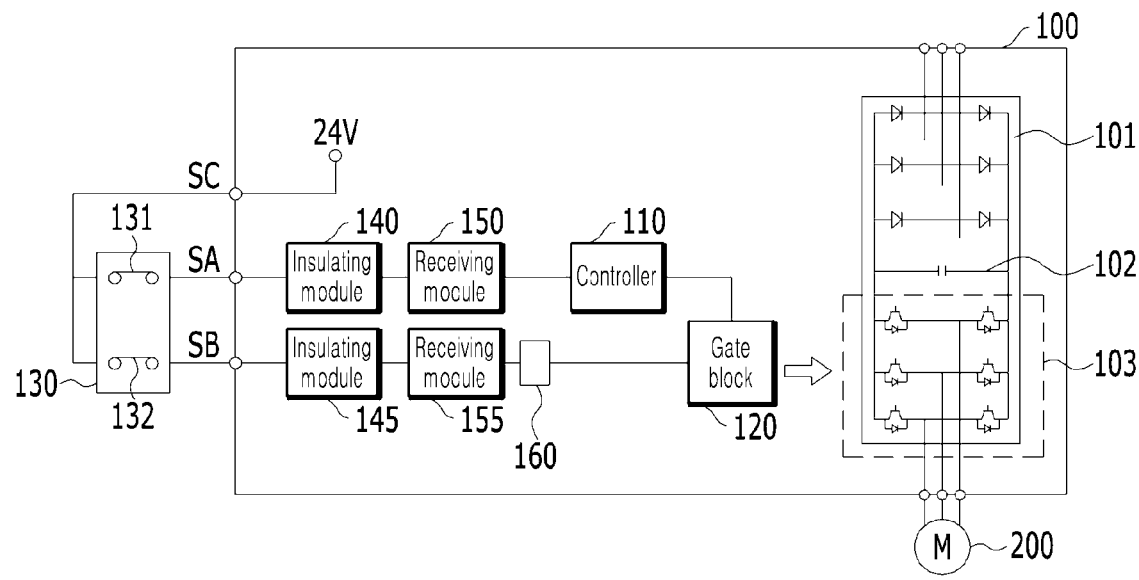
FIG. 1 shows a configuration of a conventional inverter-protecting device.

Hereinafter, a inverter-protecting device in accordance with the present disclosure will be described with reference to the accompanying drawings.

For simplicity and clarity of illustration, elements in the figures, are not necessarily drawn to scale. The same reference numbers in different figures, denote the same or similar elements, and as such perform similar functionality. Also, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The above objects, features and advantages will become apparent from the detailed description with reference to the accompanying drawings. Embodiments are described in sufficient detail to enable those skilled in the art in the art to easily practice the technical idea of the present disclosure. Detailed descriptions of well-known functions or configurations may be omitted in order not to unnecessarily obscure the gist of the present disclosure. Hereinafter, embodiments of the present disclosure will be described in detail with reference to the accompanying drawings. Throughout the drawings, like reference numerals refer to like elements.

Unless defined otherwise, all terms used herein have the same meaning as commonly understood by one of ordinary skill in the art. When the terms used herein are in conflict with a general meaning of the term, the meaning of the terms in accordance with a definition used herein.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

Figure 2:
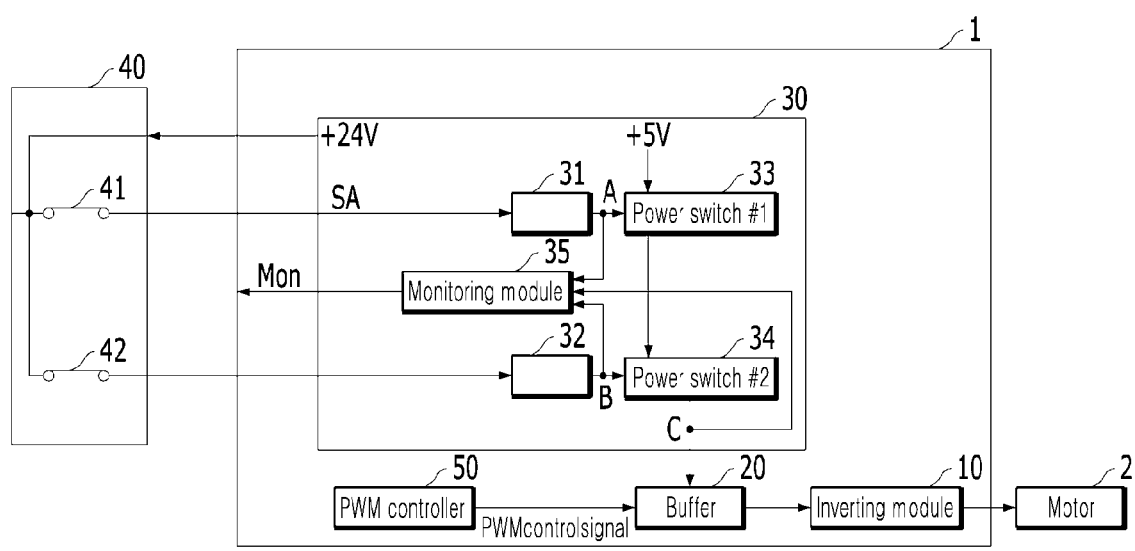
FIG. 2 is a schematic representation of an inverter-protecting device of one embodiment of the present disclosure.

FIG. 2 is a schematic representation of an inverter-protecting device of one embodiment of the present disclosure.

As shown in the figure, an inverter-protecting device 30 of one embodiment of the present disclosure is provided inside an inverter 1. The inverter-protecting device 30 may supply+ 24V power to a safety relay 40, which is located outside the inverter 1. However, this is an illustrative example. The present disclosure is not limited thereto. Depending on a setting of a rated voltage of the inverter 1, a voltage different from the 24V may be provided to the safety relay. Alternatively, power may be supplied to the safety relay from the outside of the inverter 1.

The safety relay 40 may include a first switch 41 and a second switch 42 arranged in parallel. The safety relay 40 has a closed state as a normal operation state. The safety relay 40 may be manufactured according to safety standards for relays to enhance a safety of various mechanical apparatus. A configuration of the relay is well known to those skilled in the art, and a detailed description thereof will be omitted.

When a contact of at least one of the first or second switch 41 or 42 of the safety relay 40 is opened by various safety operations of the inverter 1, the protection device 30 in accordance with the present disclosure is configured to protect the inverter 1 via performing a protection operation. The safety operation of the inverter 1 may be performed by a higher level controller (not shown) and may be performed via mechanical contacting operations.

In one embodiment of the present disclosure, the inverter 1 may include an inverting module 10, a PWM controller 50, and buffer 20. The inverting module 10 is configured to have a plurality of switching elements and to convert a DC voltage to an AC voltage and output the AC voltage to the motor. The PWM controller 50 outputs a pulse width modulation (PWM) control signal for controlling the switching elements of the inverting module 10 to output an alternating voltage, based on a command voltage. The buffer 20 provides the PWM control signal to the inverting module 10. The switching element of the inverting module 10 may be, for example, an IGBT, but the present disclosure is not limited thereto. Various power semiconductor switching elements may be used as the switching element of the inverting module 10. The buffer 20 may apply the PWM control signal provided from the PWM controller 50 to a gate of each of the switching elements of the inverting module 10. For example, the buffer may be turned on or off by a power of 5V. That is, when 5 V power is applied to the buffer, the buffer is turned on to allow the PWM control signal to be applied to the inverting module 10. When the 5V power is not applied to the buffer, the buffer is turned off to disallow the PWM control signal to be applied to the inverting module 10. The buffer 20 may be embodied as a gate block.

In one embodiment of the present disclosure, the inverter-protecting device 30 may include a first insulating module 31, a second insulating module 32, a first power switch 33, a second power switch 34, and a monitoring module 35.

The first insulating module 31 may insulate a voltage signal applied from the first switch 41. The second insulating module 32 may insulate a voltage signal applied from the second switch 42.

Each of the first and second power switches 33 and 34 may be embodied as a metal-oxide-semiconductor field-effect transistor (MOSFET), but the present disclosure is not limited thereto. Various power semiconductor switches may be used as each of the first and second power switches 33 and 34.

When a voltage signal of 24V is applied to each of the first and second power switches 33 and 34, each of the first and second power switches 33 and 34 may be turned on. That is, the voltage signal of 24V may be a voltage signal higher than a threshold voltage for each of the first and second power switches 33 and 34. However, the present disclosure is not limited thereto. When a magnitude of the voltages applied from the relay to the first and second power switches 33 and 34 respectively changes from the 24V to a different value, the threshold voltage for each of the first and second power switches 33 and 34 may vary.

The first and second power switches 33 and 34 are connected in series. The first and second power switches 33 and 34 are connected in series via a 5V power line. That is, when a voltage signal of the 24V is applied from the first and second switches 41 and 42 to the first and second power switches 33 and 34 respectively, the first and second power switches 33 and 34 are switched to the on state. Thus, the power of 5 V may be directly applied to the buffer 20. Thus, the buffer 20 is turned on when 5 V of power is supplied thereto. Then, the PMW control signal supplied from the PWM controller 50 may be applied to the inverting module 10. When the power of 5 V is not supplied to the buffer 20, the PWM control signal supplied from the PWM controller 50 may not be applied to the inverting module 10.

The monitoring module 35 is configured to receive voltage signals of a node A between the first insulating module 31 and first power switch 33, a node B between the second insulating module 32 and second power switch 34, and a node C between the second power switch 34 and buffer 20 respectively. The monitoring module 35 may determine whether each voltage signal at each node corresponds to a normal operation state. The monitoring module 35 may include, for example, an AND gate as a logic gate. When one of the voltage signals of the three nodes indicate a fault, a monitoring signal may be provided to an outside to inform the fault state of the circuitry. For example, the monitoring signal may be provided to an external user terminal via a communication line. When the inverter 1 is provided with a human-machine interface (HMI) or a programmable logic controller (PLC), the monitoring signal may be provided to the HMI or PLC.

In one embodiment of the present disclosure, the monitoring module 35 may determine whether each voltage signal is normally applied to each node, that is, whether the circuitry operate in a normal state. However, the monitoring module 35 may not determine whether a failure of each element occurs. That is, the monitoring module 35 may reflect a failure state of the protecting-device 30 in the inverter 1 and output the failure state.

The present disclosure describes an embodiment in which the monitoring module 35 outputs anormal state of each node of the protecting-device 30 via a monitoring signal processed by the AND gate. However, the present disclosure is not limited thereto. For example, a plurality of monitoring modules may be deployed, and each monitoring signal indicating the normal state of each node may be output, and the HMI, PLC, or external user terminal may check a status of each node corresponding to the corresponding monitoring signal.

Thus, according to one embodiment of the present disclosure, the monitoring module 35 also provides a simple way to determine the state of the circuitry. In the conventional case, the controller 110 checks a state of the gate block 120.

Hereinafter, with reference to FIG. 3 and FIG. 4, an operation of the protecting device 30 in accordance with the present disclosure will be described in detail.

Figure 3:
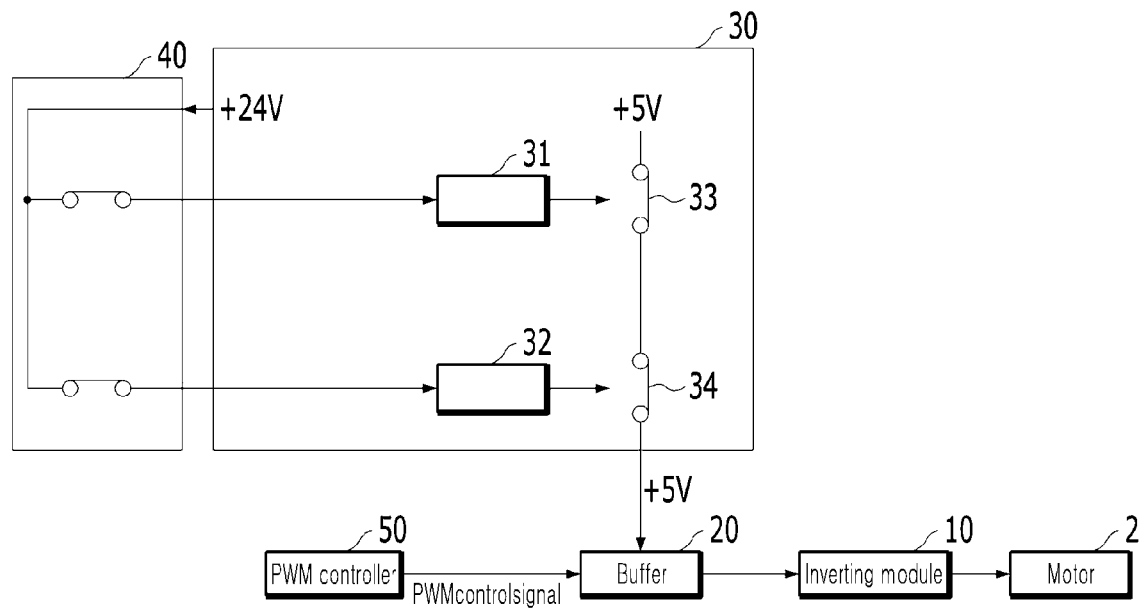
FIG. 3 is an example for describing an operation when both 24V voltage signals from a safety relay are provided to the protection device.

FIG. 3 is an example for describing an operation when both of the voltage signals of 24V from the safety relay 40 are provided to the protecting-device 30. FIG. 4 is an example for describing an operation when the contact of the first switch 41 of the safety relay 40 is opened according to the safety operation.

Referring to FIG. 3, the 24V voltage signal applied from the first switch 41 of the safety relay 40 is isolated by the first insulating module 31, and then is applied to the first power switch 33. Thus, the first power switch 33 may be turned on. Meanwhile, the voltage signal of 24 V applied from the second switch 42 of the safety relay 40 is isolated by the second insulating module 32, and then is applied to the second power switch 34. Thus, the second power switch 34 may be turned on.

When both of the first and second power switches 33 and 34 connected in series are turned on, the 5V power may be applied to the buffer 20. As a result, the buffer 20 may be turned on. When the buffer 20 is turned on, the PWM control signal generated from the PWM controller 50 may be applied to a gate of each of the switching elements of the inverting module 10 through the buffer 20. In this way, an alternating current power may be output to the motor 2.

Figure 4:
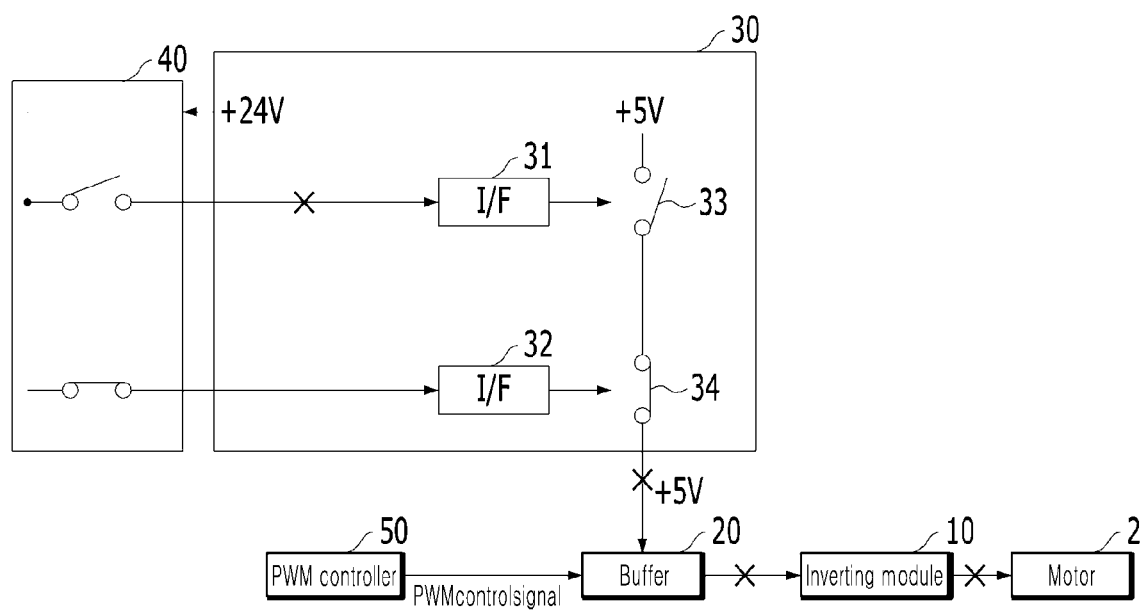
FIG. 4 is an example for describing an operation when a first switch of the safety relay is turned off according to a safety operation.

Referring to FIG. 4, when the first switch 41 of the safety relay 40 is turned off by a safety operation, there is no voltage signal applied to a gate of the first power switch 33. Thus, the first power switch 33 is turned off. Further, the voltage signal of 24V applied from the second switch 42 of the safety relay 40 is isolated by the second insulating module 32 and then is applied to the second power switch 34. Thus, the second power switch 34 may be turned on.

The off state of the first power switch 33 connected in series with the second power switch 34 may prevent the power of 5V from being provided to the buffer 20. As a result, the buffer 20 is turned off.

When the buffer 20 is off, the PWM control signal generated by the PWM controller 50 cannot be applied to the gate of each of the switching elements of the inverting module 10. Eventually, the output of the inverter 1 is not provided to the motor 2.

The present disclosure may implement a hardware-based inverter-protecting device without the verification using the software.

That is, the hardware-based inverter-protecting device in accordance with the present disclosure can control power to a buffer via first and second power switches connected in series such that when at least one of both signals from a safety relay is not input to the power switches, the power is prevented from being supplied to the buffer. This may enhance the safety function.

Further, the hardware-based inverter-protecting device in accordance with the present disclosure outputs a monitoring signal that monitors whether or not circuitry in the protection device is in a normal state and determines a presence or absence of a failure of the circuitry, thereby improving reliability of the circuitry itself.

It will be apparent to those skilled in the art that various modifications and variations may be made in the present invention without departing from the spirit of the present disclosure. The technical scope of the present disclosure is not limited to the contents described in the embodiments but should be determined by the claims and equivalents thereof

What is claimed is:

1. A device for protecting an inverter, wherein the device is configured to determine, based on voltage signals received from a first switch and a second switch of a safety relay connected in parallel, whether to allow or disallow a pulse width modulation (PWM) control signal to be applied via a buffer of an inverter to an inverting module of the inverter, wherein the device comprises:
    a first power switch configured to be turned on when a first voltage signal from the first switch is applied thereto;
    a second power switch connected in series with the first power switch, wherein the second power switch is configured to be turned on when a second voltage signal from the second switch is applied thereto;
    a power line configured to connect the first power switch and the second power switch to each other in series and to connect the series of the first power switch and the second power switch to the buffer, wherein a third voltage signal is applied via the power line to the buffer, and
    a PWM controller configured to generate and output the PWM control signal for controlling switching elements of the inverting module to output an alternating voltage,
    wherein the buffer is connected between the PWM controller and the inverting module,
    wherein when the third voltage signal is applied via the power line to the buffer, the buffer is turned on to allow the PWM control signal generated from the PWM controller to be applied to the inverting module.

2. The device of claim 1, wherein the device further comprises:
    a first insulating module disposed between the first switch and the first power switch and configured to insulate the first voltage signal; and
    a second insulating module disposed between the second switch and the second power switch and configured to insulate the second voltage signal.

3. The device of claim 1, wherein the first voltage signal and the second voltage signal are applied from the inverter to the first switch and the second switch respectively.

4. The device of claim 1, wherein the first voltage signal and the second voltage signal have the same magnitude.

5. The device of claim 1, wherein the device further comprises a monitoring module configured to:
    receive at least one of a voltage signal of an input node to the first power switch, a voltage signal of an input node to the second power switch, and a voltage signal of a node of the power line connecting the second power switch to the buffer; and
    output a monitoring signal corresponding to each of the voltage signals at the nodes.

6. The device of claim 5, wherein the monitoring module includes an AND gate.

7. The device of claim 1, wherein when both of the first switch and the second switch are turned on, both of the first power switch and the second power switch are turned on, and, thus, the third voltage signal is applied to the buffer via the power line, such that the buffer allows the PWM control signal to be applied to the inverting module.

8. The device of claim 1, wherein when at least one of the first switch and the second switch is turned off, at least one of the first power switch and the second power switch is turned off, and, thus, the third voltage signal is not applied to the buffer, such that the buffer disallows the PWM control signal to be applied to the inverting module.

* * * * *